(12) United States Patent
Shimizu et al.

(10) Patent No.: US 7,940,063 B2
(45) Date of Patent: May 10, 2011

(54) COORDINATE DETECTING DEVICE AND METHOD

(75) Inventors: Nobuyoshi Shimizu, Shinagawa (JP); Koichi Kondoh, Shinagawa (JP); Shiro Hirota, Shinagawa (JP); Norio Endo, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 279 days.

(21) Appl. No.: 12/423,845

(22) Filed: Apr. 15, 2009

(65) Prior Publication Data

US 2009/0289643 A1    Nov. 26, 2009

(30) Foreign Application Priority Data

May 20, 2008  (JP) ................................ 2008-131940

(51) Int. Cl.
*G01R 27/08* (2006.01)
(52) U.S. Cl. ....................................... 324/713; 134/173
(58) Field of Classification Search .................. 324/537, 324/713; 345/173
See application file for complete search history.

(56) References Cited

U.S. PATENT DOCUMENTS 5,455,574 A * 10/1995 Itaya et al. ...................... 341/20
6,373,474 B1 * 4/2002 Katabami ...................... 345/173

FOREIGN PATENT DOCUMENTS

JP    10-083251    3/1998

* cited by examiner

*Primary Examiner* — Vincent Q Nguyen
(74) *Attorney, Agent, or Firm* — IPUSA, PLLC (57) ABSTRACT

A coordinate detecting device includes a resistive film disposed on a quadrangular substrate; a power source for applying a voltage to the resistive film; four electrodes connected to the power source and disposed in four corners of the resistive film; four switches each disposed between the power source and a corresponding electrode; four ammeters for measuring currents flowing through corresponding electrodes; and a grounded conductive film for detecting coordinates of a contact point on the resistive film when the conductive film is brought in contact with the resistive film. The voltage is applied sequentially to the electrodes by opening and closing the switches. When the conductive film is brought in contact with the resistive film, the ammeters sequentially measure currents flowing through the corresponding electrodes. The coordinates of the contact point are detected based on positions of the electrodes and resistances obtained using the measured currents.

9 Claims, 12 Drawing Sheets

COORDINATE DETECTING DEVICE AND METHOD

BACKGROUND OF THE INVENTION

1. Field of the Invention

The present invention is directed to a coordinate detecting device and a coordinate detecting method.

2. Description of the Related Art

Touch panels are an example of input devices for computer systems. A touch panel is mounted on a display to detect a coordinate position on the display and obtain a detection signal corresponding to the coordinate position. The panel allows a direct input and enables a user to have an easy and intuitive input.

Various types of touch panels have been proposed, including resistive touch panels, optical touch panels and capacitively-coupled touch panels. Among them, resistive touch panels having a simple configuration and control system are in widespread use. Low resistive touch panels include four-wire, five-wire and eight-wire touch panels, for example, the difference of which comes in how electrodes are arranged on a resistive film.

Compared to four-wire and eight-wire touch panels, five-wire touch panels are free from edge sliding, which is a shortcoming of the four-wire and eight-wire touch panels. This is because, in the five-wire touch panels, a conductive film of the upper substrate which is disposed on the operation surface is used only for reading an electric potential. Accordingly, the five-wire touch panels are used in harsh usage environments and markets requiring touch-panels with long-life durability.

Figure 12:
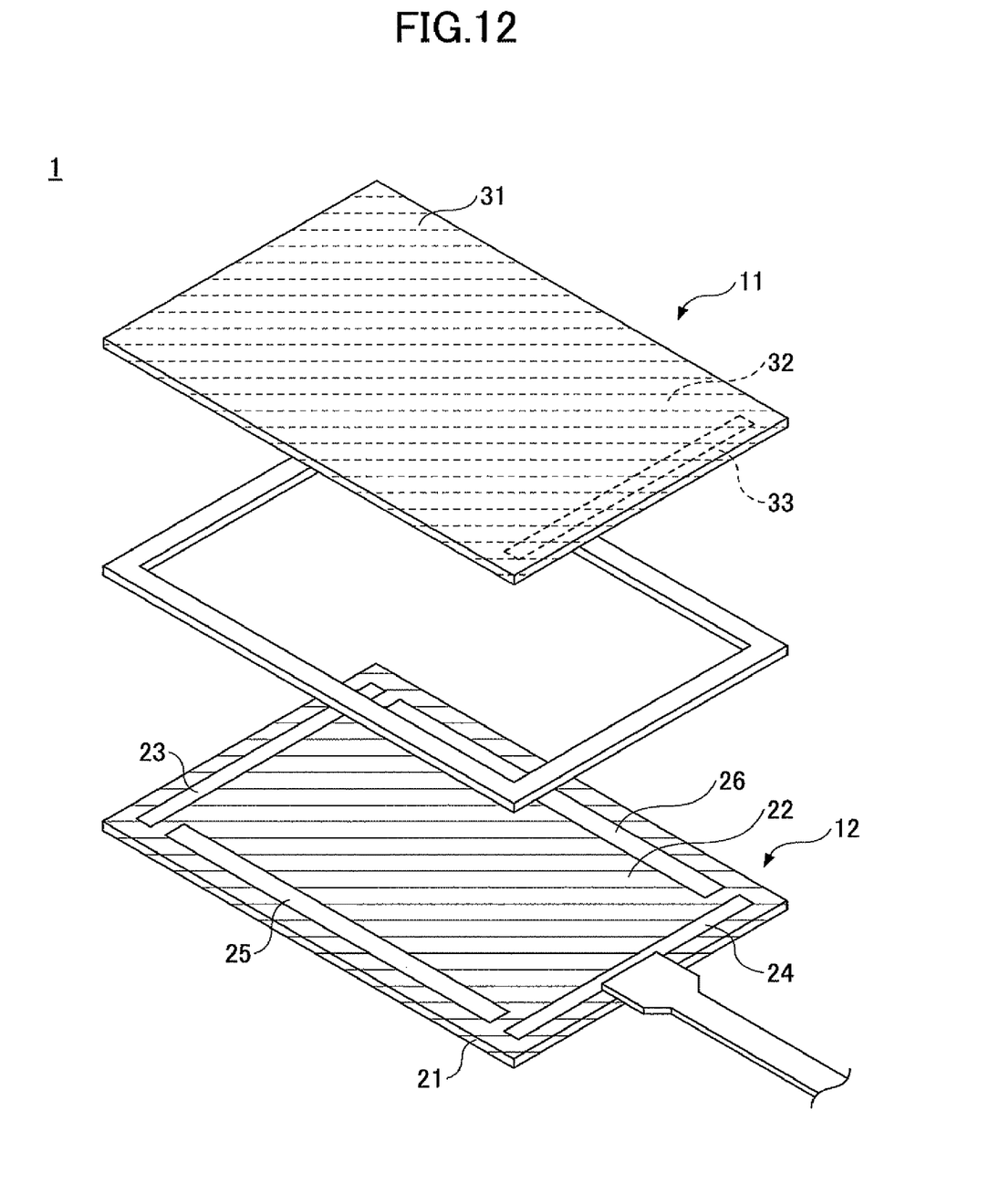
FIG. 12 shows a structure of a five-wire resistive touch panel.

FIG. 12 shows a structural diagram of a five-wire resistive touch panel. A five-wire resistive touch panel 1 includes an upper substrate 11 and a lower substrate 12. In the lower substrate 12, a transparent resistive film 22 is formed over the entire surface of a glass substrate 21, and X-axis coordinate detecting electrodes 23 and 24 and Y-axis coordinate detecting electrodes 25 and 26 are disposed on the transparent resistive film 22. In the upper substrate 11, a transparent resistive film 32 is formed on a film substrate 31, and a coordinate detecting electrode 33 is disposed on top of the transparent resistive film 32.

When a voltage is applied to the X-axis coordinate detecting electrodes 23 and 24, an electric potential distribution is obtained in the X-axis direction in the transparent resistance film 22 of the lower substrate 12. At this point, the electric potential in the transparent resistive film 22 of the lower substrate 12 is detected, thereby detecting an X coordinate of a contact point where the upper substrate 11 comes in contact with the lower substrate 12. Subsequently, by applying a voltage to the Y-axis coordinate detecting electrodes 25 and 26, an electric potential distribution is obtained in the Y-axis direction in the transparent resistive film 22 of the lower substrate 12. At this point, the electric potential in the transparent resistive film 22 of the lower substrate 12 is detected, thereby detecting a Y coordinate of the contact point.

Patent Document 1 discloses such a coordinate detecting device having improved precision in detecting a coordinate position.

[Patent Document 1] Japanese Laid-open Patent Application Publication No. H10-83251

The coordinate detecting device of Patent Document 1 is able to perform precise detection when contact is made at one point; however, if contact is made at two points, the coordinate detecting device is not able to distinguish between the two points, and cannot therefore detect the two contact points at all. Although methods for detecting two contact points have been proposed, many of the cases solve the problem by dividing the transparent resistive film. Dividing the transparent resistive film causes a divisional boundary to stand out, resulting in a reduction in aesthetic appearance. Such aesthetic appearance degradation could be fatal for touch panels and other display panels, and therefore, there is a demand a method for detecting two contact points without dividing the transparent resistive film.

SUMMARY OF THE INVENTION

In view of the above-mentioned problems, the present invention aims at providing a coordinate detecting device and a coordinate detecting method capable of detecting coordinate positions even when contact is made at two points, without damaging the aesthetic appearance.

One aspect of the present invention may be a coordinate detecting device including a resistive film disposed on a quadrangular substrate made of an insulating material; a power source configured to apply a voltage to the resistive film; four electrodes, each of which is connected to the power source and individually disposed in one of four corners of the resistive film; four switches, each of which is individually disposed between the power source and one of the electrodes; four ammeters, each of which is configured to measure a current flowing through a corresponding one of the electrodes; and a grounded conductive film configured to detect coordinates of a contact point on the resistive film when the conductive film is brought in contact with the resistive film. The voltage is applied sequentially to the electrodes by opening and closing the switches. When the conductive film is brought in contact with the resistive film, each of the ammeters sequentially measures the current flowing through the corresponding one of the electrodes. The coordinates of the contact point are detected based on positions of the electrodes and resistances obtained using currents measured by the ammeters.

Another aspect of the present invention may be a coordinate detecting method applied to a coordinate detecting device which includes a resistive film disposed on a quadrangular substrate made of an insulating material; a power source configured to apply a voltage to the resistive film; four electrodes including a first electrode, a second electrode, a third electrode and a fourth electrode, each of which is connected to the power source and individually disposed in one of four corners of the resistive film; four switches including a first switch which is disposed between the power source and the first electrode, a second switch which is disposed between the power source and the second electrode, a third switch which is disposed between the power source and the third electrode, and a fourth switch which is disposed between the power source and the fourth electrode; four ammeters including a first ammeter which is connected in series to the first switch and configured to measure a first current flowing through the first electrode, a second ammeter which is connected in series to the second switch and configured to measure a second current flowing through the second electrode, a third ammeter which is connected in series to the third switch and configured to measure a third current flowing through the third electrode, and a fourth ammeter which is connected in series to the fourth switch and configured to measure a fourth current flowing through the fourth electrode; and a grounded conductive film configured to detect coordinates of a contact point on the resistive film when the conductive film is brought in contact with the resistive film. The coordinate detecting method includes a first measurement step of closing only the first switch, applying the voltage to the resistive film, and causing the first ammeter to measure the first current; a second measurement step of opening the first switch, then closing only the second switch, applying the voltage to the resistive film, and causing the second ammeter to measure the second current; a third measurement step of opening the second switch, then closing only the third switch, applying the voltage to the resistive film, and causing the third ammeter to measure the third current; a fourth measurement step of opening the third switch, then closing only the fourth switch, applying the voltage to the resistive film, and causing the fourth ammeter to measure the fourth current; a first calculation step of calculating resistances, each of which is individually obtained based on one of the first current, the second current, the third current and the fourth current; and a second calculation step of calculating, based on the calculated resistances, the coordinates of a single contact point or two contact points on the resistive film.

DETAILED DESCRIPTION OF THE PREFERRED EMBODIMENTS

Embodiments that describe the best mode for carrying out the present invention are explained next. The embodiments relate to a coordinate detecting device.

(a) First Embodiment

The first embodiment relates to a coordinate detecting device and a coordinate detecting method capable of detecting coordinate positions even when contact is made at two points.

[Coordinate Detecting Device]

Figure 1:
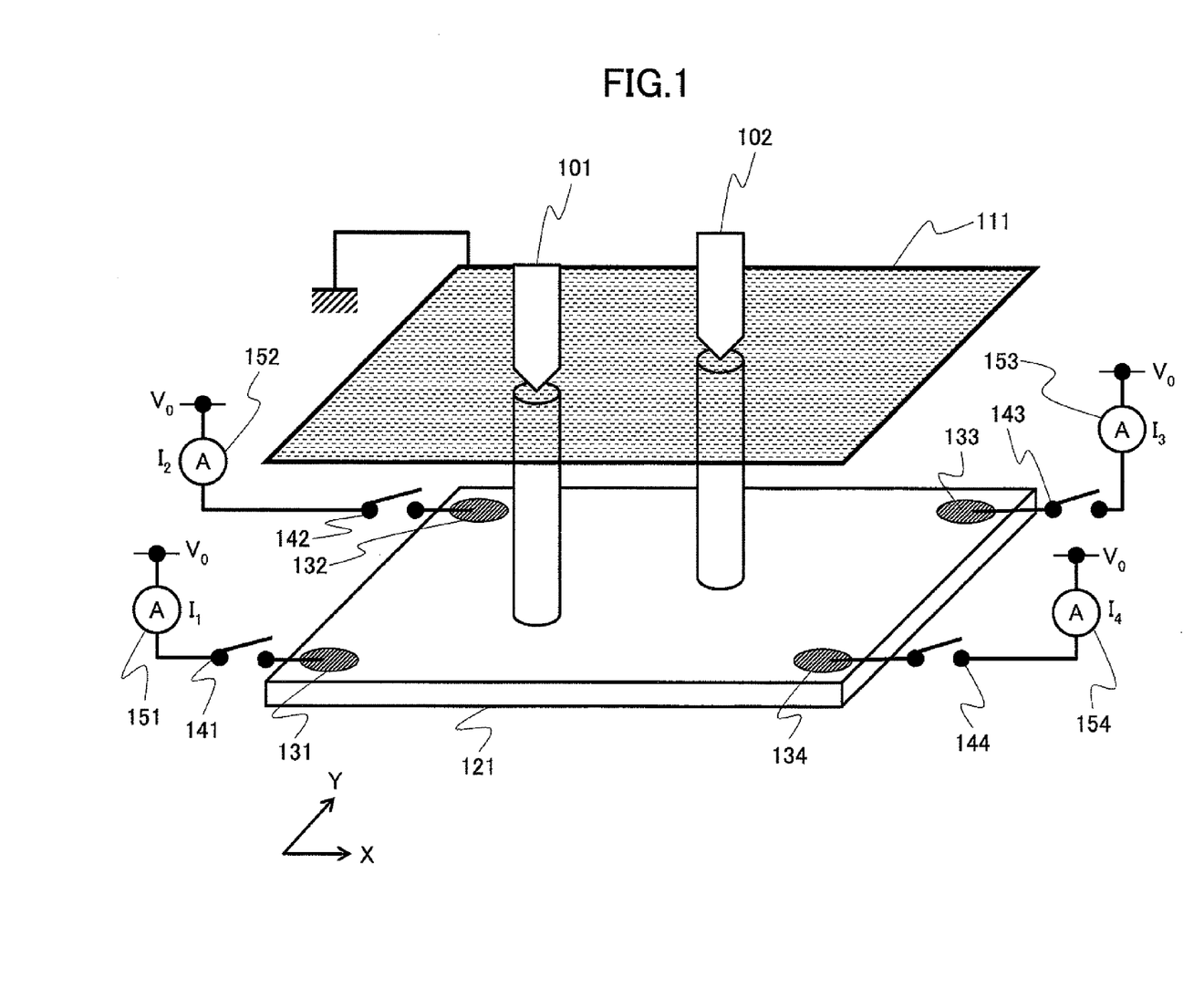
FIG. 1 is a perspective view of a coordinate detecting device of the first embodiment.
Figure 2:
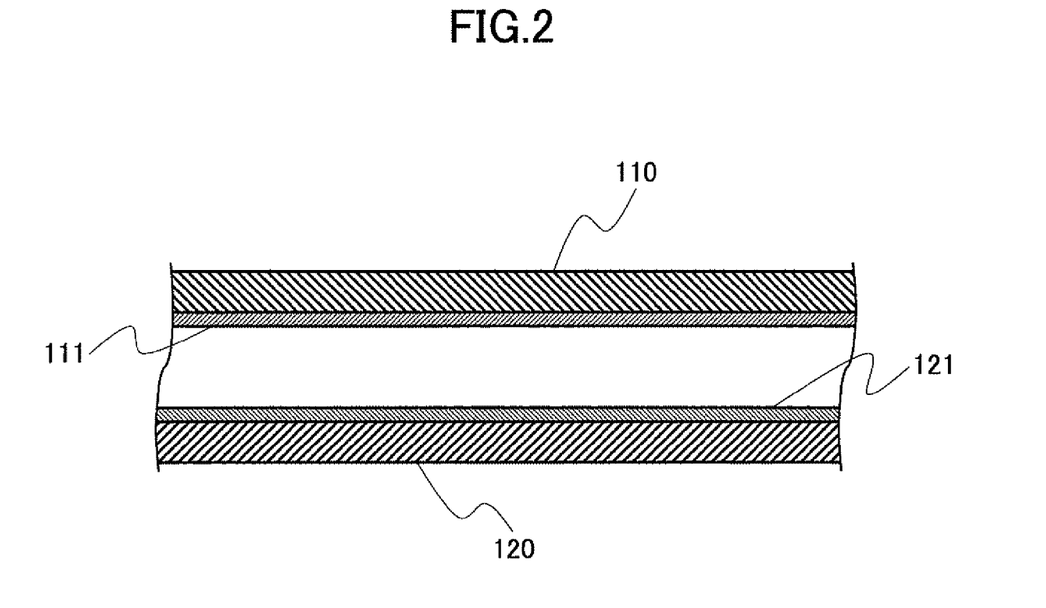
FIG. 2 is a cross-sectional view of the coordinate detecting device of the first embodiment.

The coordinate detecting device according to the present embodiment is specifically explained with reference to FIGS. 1 and 2. FIGS. 1 and 2 are a perspective view and a cross-sectional view, respectively, of the coordinate detecting device of the present embodiment.

The coordinate detecting device according to the present invention includes an upper substrate 110 and a lower substrate 120. The upper substrate 110 is a rectangular, flexible transparent substrate that transmits visible light, and has, on a surface opposing the lower substrate 120, a transparent conductive film 111 that transmits visible light and has conducting properties. On the other hand, the lower substrate 120 is a rectangular transparent substrate that transmits visible light, and has, on a surface opposing the upper substrate 110, a transparent resistive film 121 that transmits visible light. Note that the upper substrate 110 and the lower substrate 120 are not shown in FIG. 1.

Four electrodes for applying a voltage to the transparent resistive film 121 are disposed in the four corners of the transparent resistive film 121 on the lower substrate 120. Specifically, a first electrode 131, a second electrode 132, a third electrode 133 and a fourth electrode 134 are disposed in the four corners of the transparent resistive film 121. For each of these four electrodes, a switch is provided for controlling the application of a voltage to the electrode. Specifically, a first switch 141, a second switch 142, a third switch 143 and a fourth switch 144 are connected to the first electrode 131, the second electrode 132, the third electrode 133 and the fourth electrode 134, respectively. In addition, for each electrode, an ammeter which is a current measuring device is provided for measuring the current flowing through the electrode. That is, a first ammeter 151, a second ammeter 152, a third ammeter 153 and a fourth ammeter 154 are respectively connected to the corresponding switches 141 through 144. Each ammeter 151 through 154 is connected to a power source used for applying a voltage Vo.

According to the coordinate detecting device of the present embodiment, the lower substrate 120 and the upper substrate 110 come in contact with each other when the upper substrate 110, which is grounded, is pressed with a finger or the like. That is, the transparent resistive film 121 of the lower substrate 120 and the transparent conductive film 111 of the upper substrate 110 come in contact with each other, whereby an electric potential at the contact point on the transparent resistive film 121 of the lower substrate 120 becomes 0 [V]. A voltage is applied from the power source having the voltage Vo, and the amount of current flowing through each ammeter 151 through 154 is measured to detect the contact point. FIG. 1 illustrates contact at two points, and more specifically, abstractly represents contact at a first contact point 101 and a second contact point 102.

In order to detect such contact points, the transparent conductive film 111 of the upper substrate 110 has a lower sheet resistance than that of the transparent resistive film 121 of the lower substrate 120. That is, in order to bring the electric potential at the contact point on the transparent resistive film 121 of the lower substrate 120 as close to 0 [V] as possible, it is necessary to lower the resistance of the transparent conductive film 111 of the upper substrate 110. Based on the experience of the inventors, the sheet resistance of the transparent conductive film 111 needs to be ¹⁄₁₀ or less than that of the transparent resistive film 121. The inventors have found from their experience that, if this condition is not met, the coordinate detecting device of the present embodiment causes a dramatic reduction in the detection precision and cannot therefore perform contact point detection.

In order to achieve the above function, the transparent conductive film 111 is made of a material including indium tin oxide (ITO), a conductive polymer, $SnO_2$, $In_2O_3$ or ZnO, all of which are transparent in the visible range. In addition, in order to allow the transparent conductive film 111 of the upper substrate and the transparent resistive film 121 of the lower substrate 120 to come in contact with each other by pressing the upper substrate 110 with a finger or the like, the upper substrate 110 needs to be made of a flexible material. Specifically, the upper substrate 110 may be made of, for example, polycarbonate (PC), polyethylene terephthalate (PET), glass, polyolefin, or micro olefin polymer.

[Coordinate Detecting Method]

Next is described the coordinate detecting method of the present embodiment with reference to FIG. 1.

The following describes a case where in the above-described coordinate detecting device, contact is made at two points of the first and second contact points 101 and 102. That is to say, two points are pressed on the upper substrate 110 with fingers or the like, whereby the transparent conductive film 111 of the upper substrate 110 and the transparent resistive film 121 of the lower substrate 120 are brought in contact with each other at the first and second contact points 101 and 102.

Figure 4:
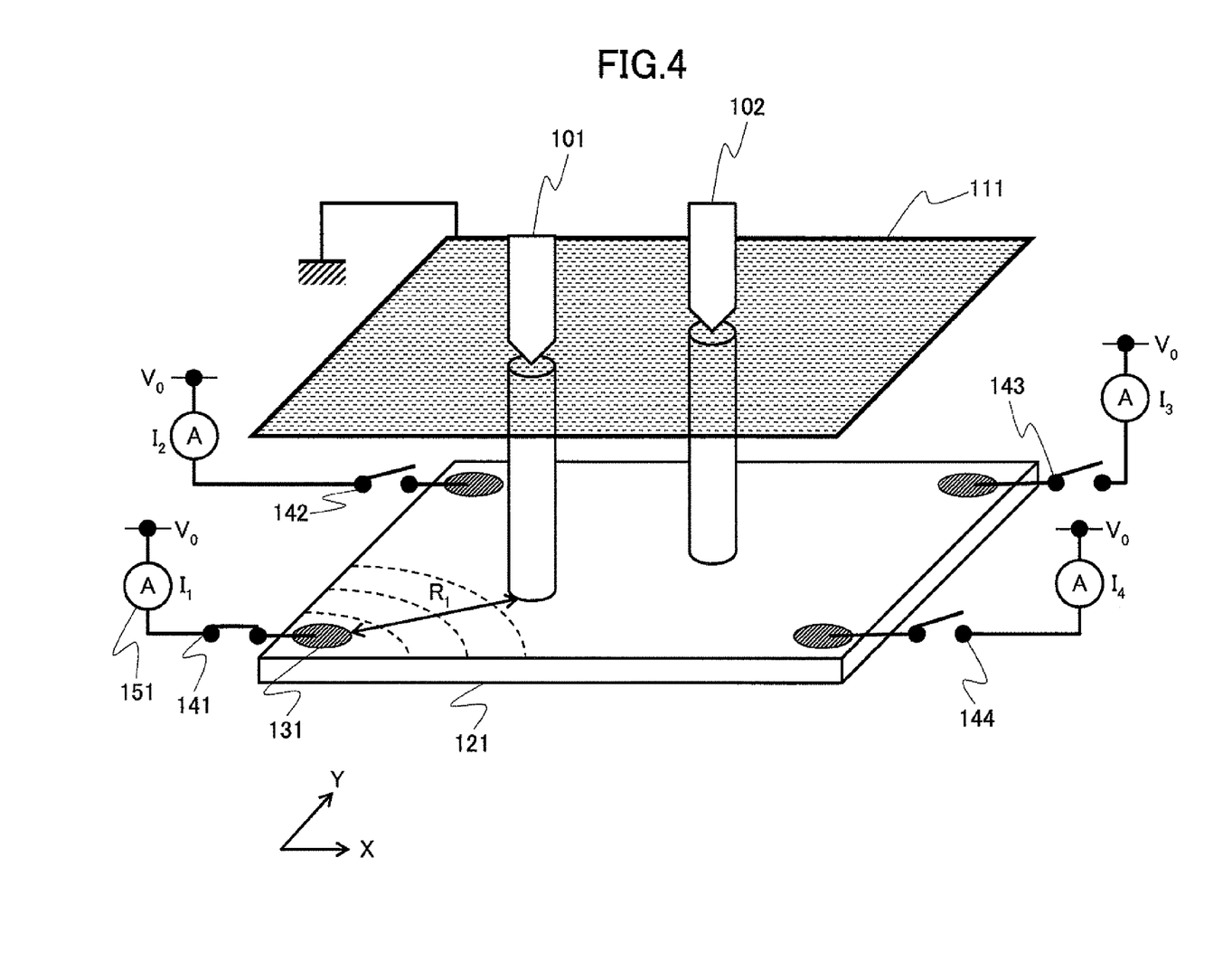
FIG. 4 is a schematic diagram (1) illustrating a detection process according to the coordinate detecting method of the first embodiment.

First, in Step S102, the voltage Vo is applied to the first electrode 131. Specifically, as illustrated in FIG. 4, only the first switch 141 is turned ON while the second, third and fourth switches 142, 143 and 144 are turned OFF. In this way, the power source having the voltage Vo is connected to the first electrode 131 via the first ammeter 151.

At this point, the transparent conductive film 111 of the upper substrate 110 and the transparent resistive film 121 of the lower substrate 120 are in contact with each other at the two points 101 and 102, and the transparent conductive film 111 is grounded. Accordingly, the current from the power source having the voltage Vo flows through the first electrode 131 via the first ammeter 151, then through the first contact point 101 and through the second contact point 102, and eventually to the transparent conductive film 111.

Next in Step S104, the amount of current I1 flowing through the first ammeter 151 is measured. In a strict sense, the current value detected by the first ammeter 151 is the sum of the current flowing from the first electrode 131 to the first contact point 101 and the current flowing from the first electrode 131 to the second contact point 102. However, of the two currents, the current flowing to a contact point closer to the first electrode 131 becomes dominant, and accordingly in this case, the current flowing through the first contact point 101 becomes dominant, as shown in FIG. 4. Therefore, here, the current flowing through the second contact point 102 is ignored and the current I1 measured by the first ammeter 151 is assumed to be the current flowing through the first contact point 101. As described later, even with such an assumption, the function of the coordinate detecting device is sufficiently ensured. Thus, the current I1 is regarded as the current flowing through the transparent resistive film 121 between the first electrode 131 and the first contact point 101. As described below, using the voltage Vo of the power source and the current I1 measured by the first ammeter 151, a resistance R1 of the transparent resistive film 121 between the first electrode 131 and the first contact point 101 is calculated.

Note that the coordinate detecting device according to the present embodiment is used in a touch panel or the like, and is designed to be pressed with a finger or the like. Accordingly, the coordinate detecting device does not have to have extreme precision in point detection, and is functionally sufficient if it is able to detect a rough contact position. Therefore, in the case where contact is made at two points, the coordinate detecting device sufficiently fulfills its function even when the current is assumed to flow only via a contact point having a dominant current flow.

Figure 5:
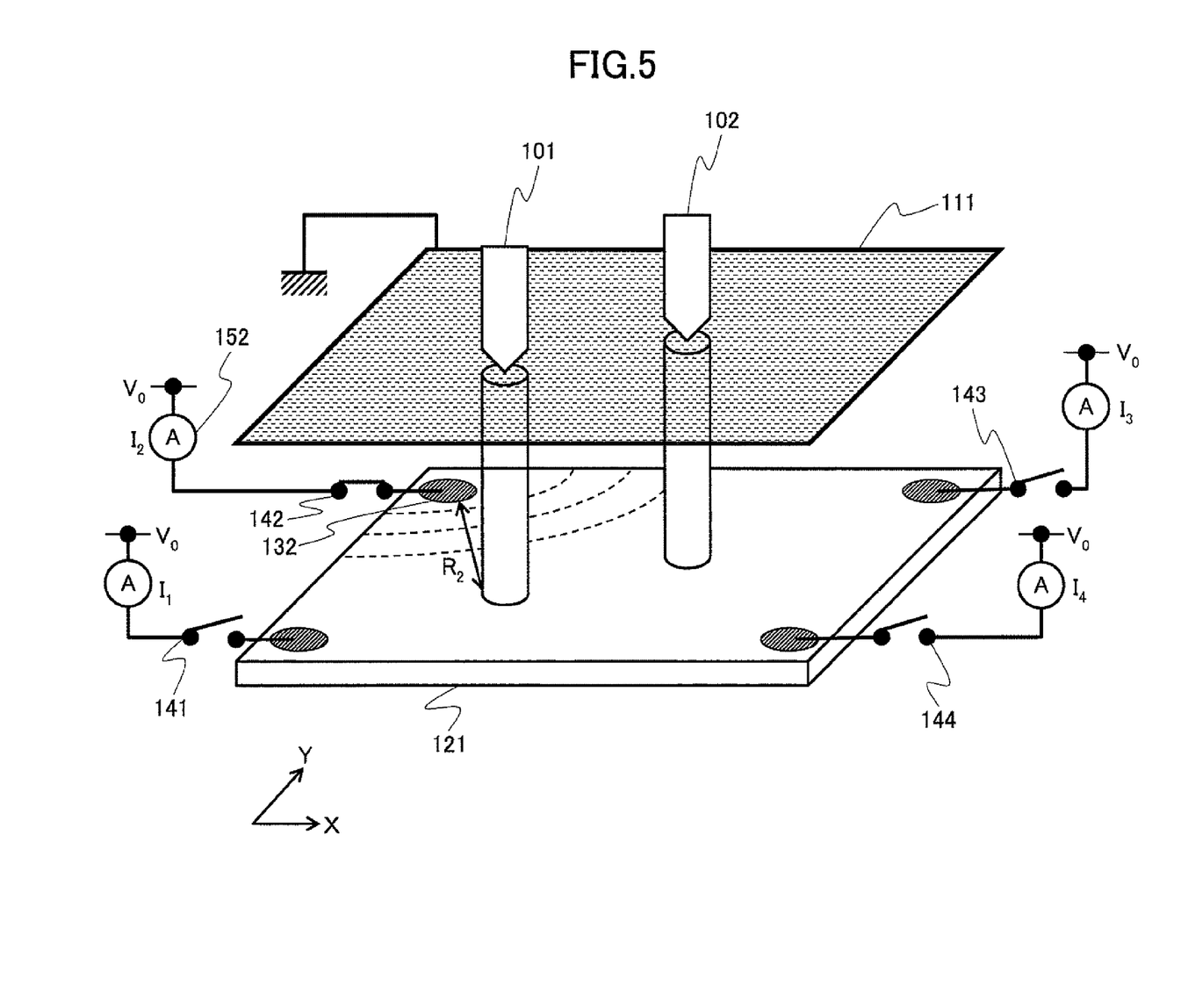
FIG. 5 is a schematic diagram (2) illustrating a detection process according to the coordinate detecting method of the first embodiment.

Next in Step S106, the voltage Vo is applied to the second electrode 132. Specifically, as illustrated in FIG. 5, only the second switch 142 is turned ON while the first, third and fourth switches 141, 143 and 144 are turned OFF. In this way, the power source having the voltage Vo is connected to the second electrode 132 via the second ammeter 152.

At this point, the transparent conductive film 111 of the upper substrate 110 and the transparent resistive film 121 of the lower substrate 120 are in contact with each other at the two points 101 and 102, and the transparent conductive film 111 is grounded. Accordingly, the current from the power source having the voltage Vo flows through the second electrode 132 via the second ammeter 152, then through the first contact point 101 and through the second contact point 102, and eventually to the transparent conductive film 111.

Next in Step S108, the amount of current I2 flowing through the second ammeter 152 is measured. In a strict sense, the current value detected by the second ammeter 152 is the sum of the current flowing from the second electrode 132 to the first contact point 101 and the current flowing from the second electrode 132 to the second contact point 102. However, of the two currents, the current flowing to a contact point closer to the second electrode 132 becomes dominant, and accordingly in this case, the current flowing through the first contact point 101 becomes dominant, as shown in FIG. 5. Therefore, here, the current flowing through the second contact point 102 is ignored and the current I2 measured by the second ammeter 152 is assumed to be the current flowing through the first contact point 101. As described above, even with such an assumption, the function of the coordinate detecting device is sufficiently ensured. Thus, the current I2 is regarded as the current flowing through the transparent resistive film 121 between the second electrode 132 and the first contact point 101. As described below, using the voltage Vo of the power source and the current I2 measured by the second ammeter 152, a resistance R2 of the transparent resistive film 121 between the second electrode 132 and the first contact point 101 is calculated.

Figure 6:
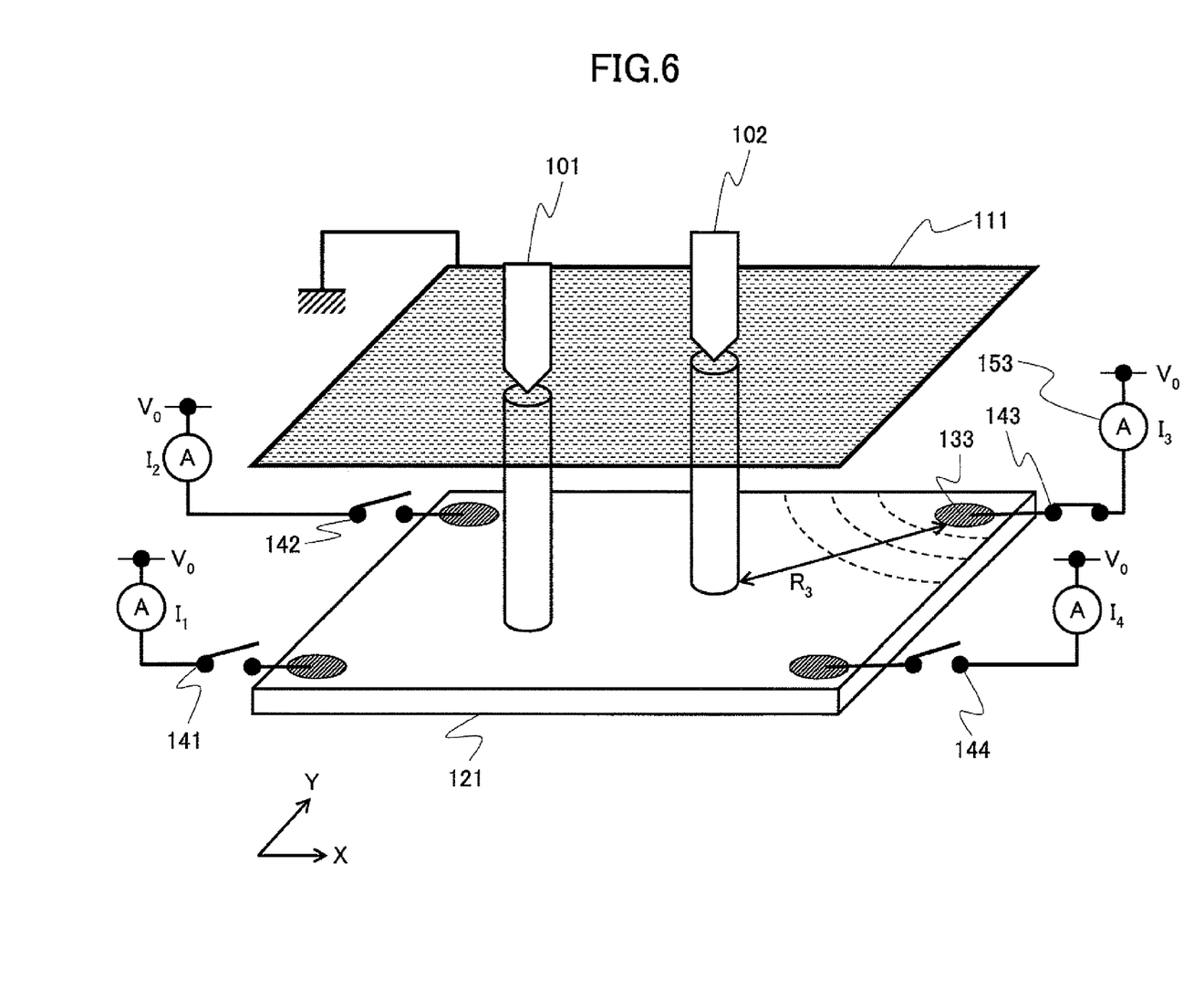
FIG. 6 is a schematic diagram (3) illustrating a detection process according to the coordinate detecting method of the first embodiment.

Next in Step S110, the voltage Vo is applied to the third electrode 133. Specifically, as illustrated in FIG. 6, only the third switch 143 is turned ON while the first, second and fourth switches 141, 142 and 144 are turned OFF. In this way, the power source having the voltage Vo is connected to the third electrode 133 via the third ammeter 153.

At this point, the transparent conductive film 111 of the upper substrate 110 and the transparent resistive film 121 of the lower substrate 120 are in contact with each other at the two points 101 and 102, and the transparent conductive film 111 is grounded. Accordingly, the current from the power source having the voltage Vo flows through the third electrode 133 via the third ammeter 153, then through the first contact point 101 and through the second contact point 102, and eventually to the transparent conductive film 111.

Next in Step S112, the amount of current I3 flowing through the third ammeter 153 is measured. In a strict sense, the current value detected by the third ammeter 153 is the sum of the current flowing from the third electrode 133 to the first contact point 101 and the current flowing from the third electrode 133 to the second contact point 102. However, of the two currents, the current flowing to a contact point closer to the third electrode 133 becomes dominant, and accordingly in this case, the current flowing through the second contact point 102 becomes dominant, as shown in FIG. 6. Therefore, here, the current flowing through the first contact point 101 is ignored and the current I3 measured by the third ammeter 153 is assumed to be the current flowing through the second contact point 102. As described above, even with such an assumption, the function of the coordinate detecting device is sufficiently ensured. Thus, the current I3 is regarded as the current flowing through the transparent resistive film 121 between the third electrode 133 and the second contact point 102. As described below, using the voltage Vo of the power source and the current I3 measured by the third ammeter 153, a resistance R3 of the transparent resistive film 121 between the third electrode 133 and the second contact point 102 is calculated.

Figure 7:
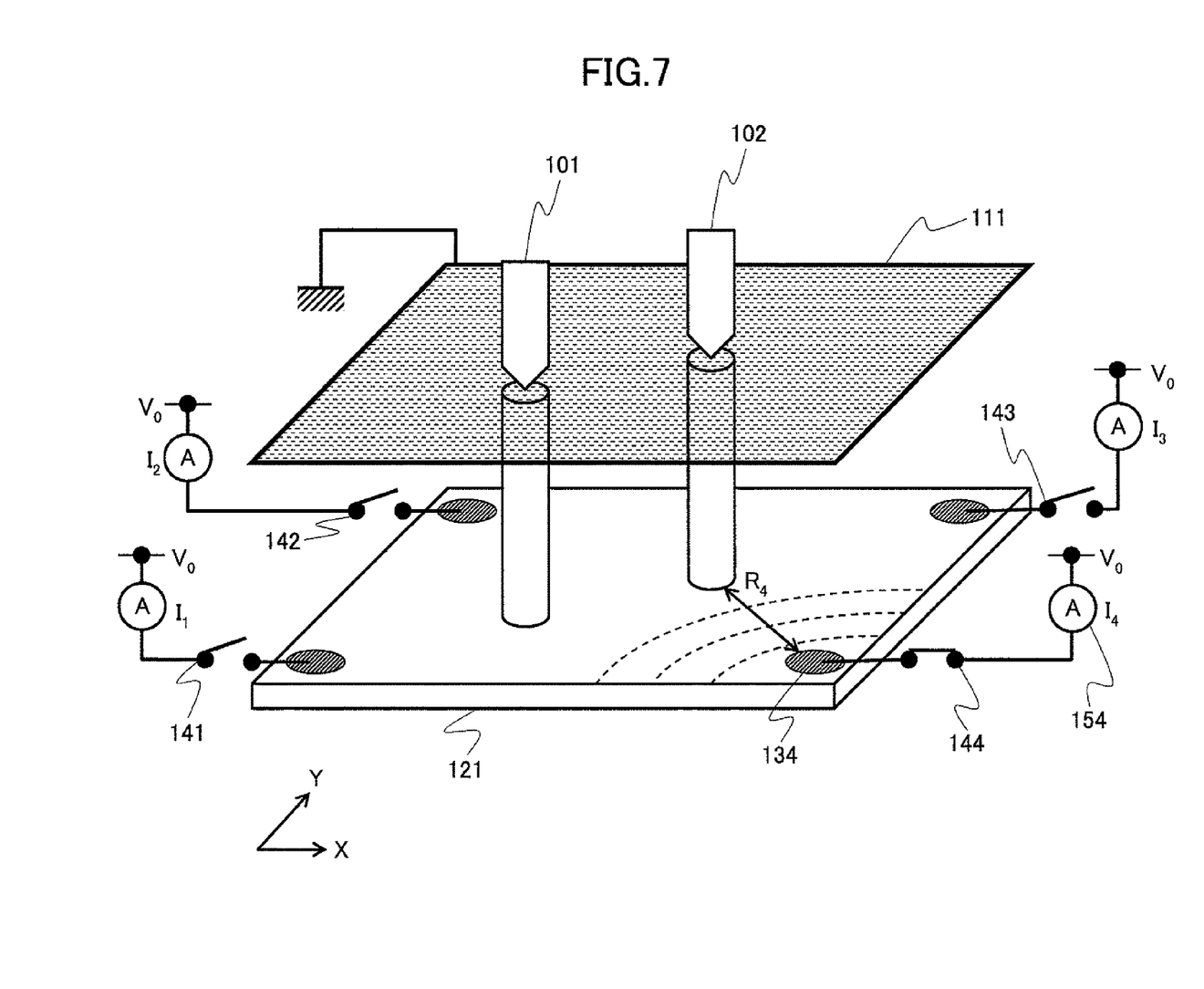
FIG. 7 is a schematic diagram (4) illustrating a detection process according to the coordinate detecting method of the first embodiment.

Next in Step S114, the voltage Vo is applied to the fourth electrode 134. Specifically, as illustrated in FIG. 7, only the fourth switch 144 is turned ON while the first, second and third switches 141, 142 and 143 are turned OFF. In this way, the power source having the voltage Vo is connected to the fourth electrode 134 via the fourth ammeter 154.

At this point, the transparent conductive film 111 of the upper substrate 110 and the transparent resistive film 121 of the lower substrate 120 are in contact with each other at the two points 101 and 102, and the transparent conductive film 111 is grounded. Accordingly, the current from the power source having the voltage Vo flows through the fourth electrode 134 via the fourth ammeter 154, then through the first contact point 101 and through the second contact point 102, and eventually to the transparent conductive film 111.

Next in Step S116, the amount of current I4 flowing through the fourth ammeter 154 is measured. In a strict sense, the current value detected by the fourth ammeter 154 is the sum of the current flowing from the fourth electrode 134 to the first contact point 101 and the current flowing from the fourth electrode 134 to the second contact point 102. However, of the two currents, the current flowing to a contact point closer to the fourth electrode 134 becomes dominant, and accordingly in this case, the current flowing through the second contact point 102 becomes dominant, as shown in FIG. 7. Therefore, here, the current flowing through the first contact point 101 is ignored and the current I4 measured by the fourth ammeter 154 is assumed to be the current flowing through the second contact point 102. As described above, even with such an assumption, the function of the coordinate detecting device is sufficiently ensured. Thus, the current I4 is regarded as the current flowing through the transparent resistive film 121 between the fourth electrode 134 and the second contact point 102. As described below, using the voltage Vo of the power source and the current I4 measured by the fourth ammeter 154, a resistance R4 of the transparent resistive film 121 between the fourth electrode 134 and the second contact point 102 is calculated.

Figure 3:
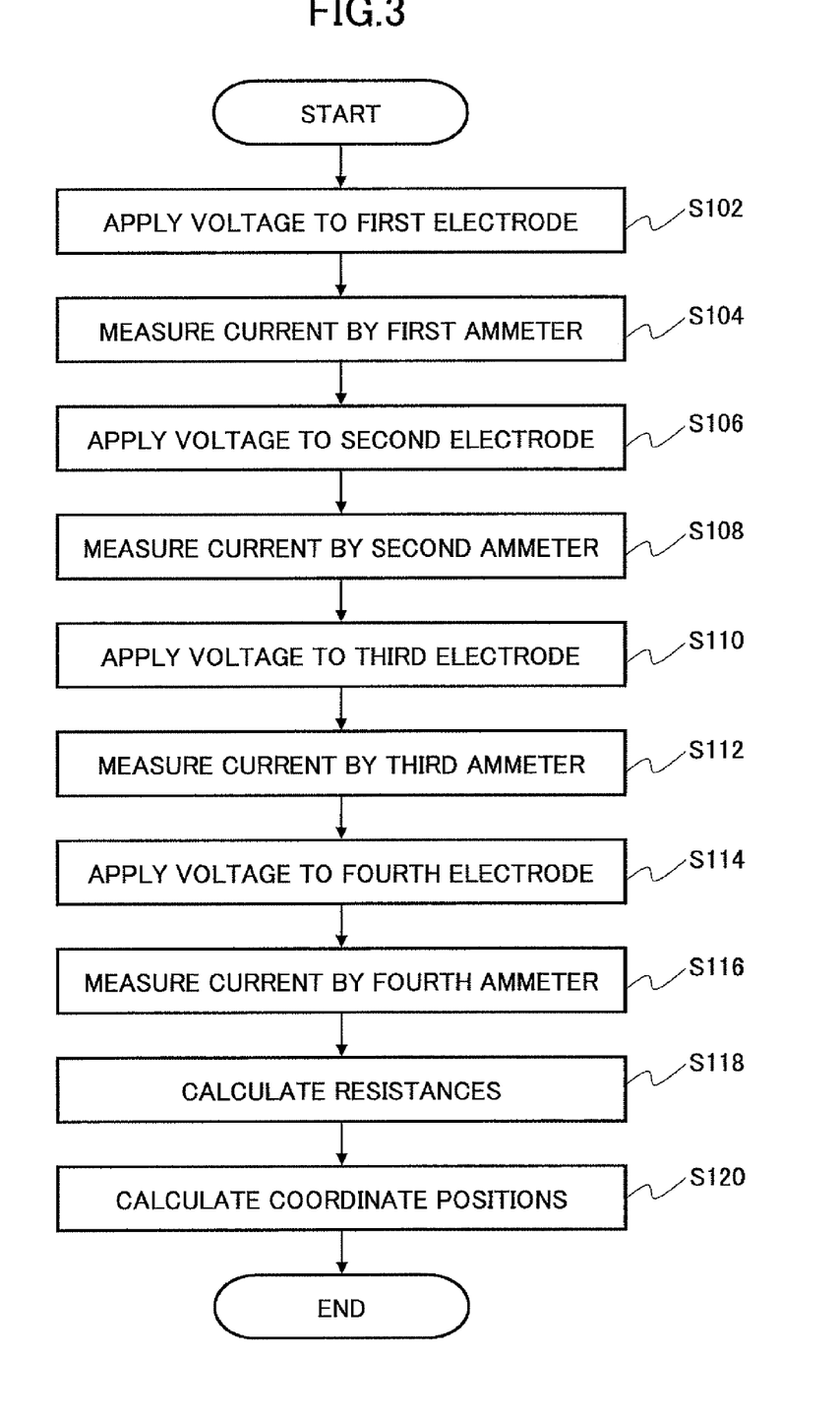
FIG. 3 is a flowchart of a coordinate detecting method of the first embodiment.

Next in Step S118, the resistances are calculated using the measured currents. Specifically, using the current I1 measured by the first ammeter 151, the resistance R1 is calculated by the following equation: R1=Vo/I1. Similarly, the resistance R2 is calculated by R2=Vo/I2 using the current I2 measured by the second ammeter 152; the resistance R3 is calculated by R3=Vo/I3 using the current I3 measured by the third ammeter 153; the resistance R4 is calculated by R4=Vo/I4 using the current I4 measured by the fourth ammeter 154.

Next in Step S120, coordinate positions of the first contact point 101 and the second contact point 102 are calculated using the resistances obtained in Step S118. That is, currents flowing through the first contact point 101 are I1 and I2, and therefore, the coordinate position of the first contact point 101 is calculated based on the resistances R1 and R2.

Specifically, in advance, a current is passed between the first electrode 131 and the second electrode 132, and a resistance R12 between the first electrode 131 and the second electrode 132 is measured using a value of the flowing current. Note that a distance L12 between the edge of the first electrode 131 and the edge of the second electrode 132 is specified when the coordinate detecting device of the present embodiment is manufactured.

There is a correlation between the resistance of the transparent resistive film 121 and the distance that the current travels. Namely, the distance that the current travels is proportional to the resistance over the distance. Therefore, a distance L1 between the first electrode 131 and the first contact point 101 can be obtained based on the resistance R12, the distance L12 between the first electrode 131 and the second electrode 132, and the resistance R1. Also, a distance L2 between the second electrode 132 and the first contact point 101 can be obtained based on the resistance R12, the distance L12 between the first electrode 131 and the second electrode 132, and the resistance R2.

Figure 8:
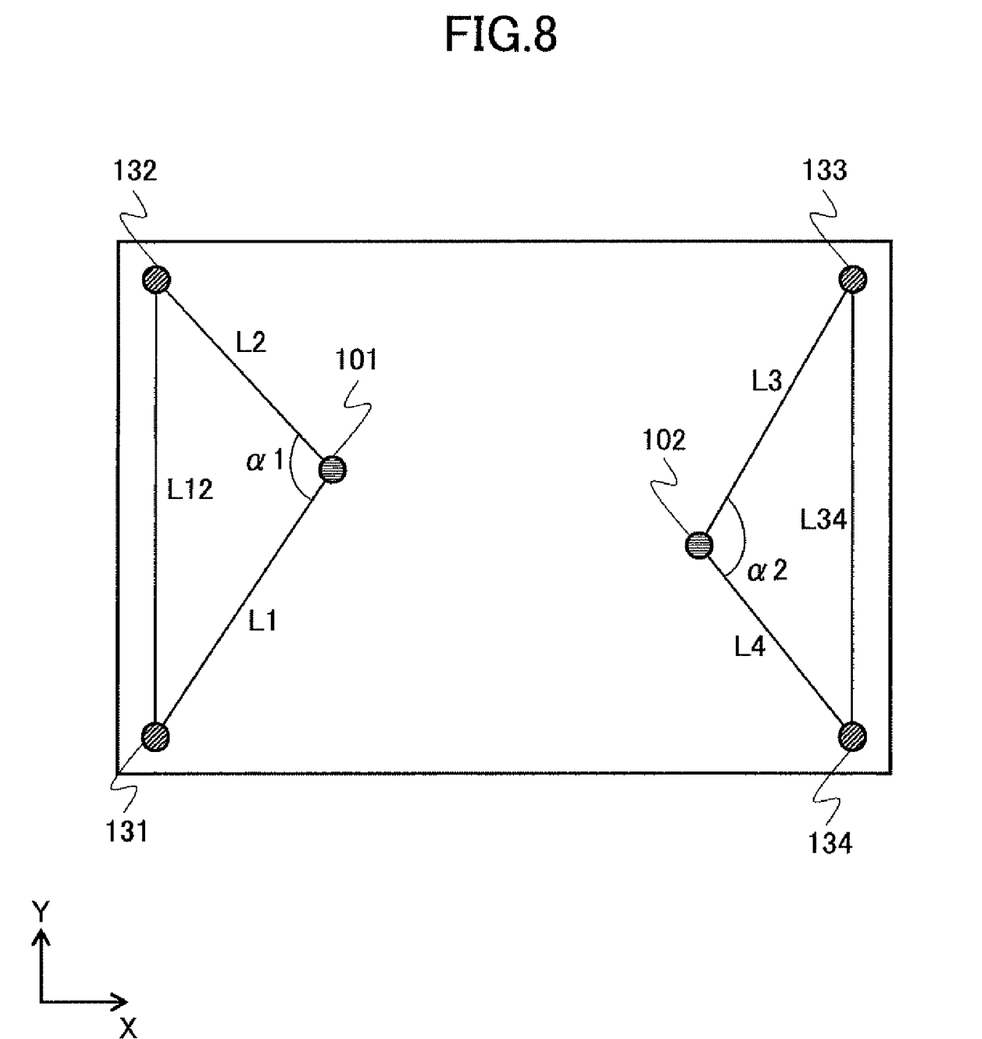
FIG. 8 is a front view illustrating processes of the coordinate detecting method of the first embodiment.

Specifically, as shown in FIG. 8, values for L1, L2 and L12 can be obtained according to L1=(L12/R12)×R1 and L2=(L12/R12)×R2. Subsequently, an angle $\alpha 1$ between L1 and L2 is obtained using the cosine law, whereby the coordinate position of the first contact point 101 is calculated.

Similarly, in advance, a current is passed between the third electrode 133 and the fourth electrode 134, and a resistance R34 between the third electrode 133 and the fourth electrode 134 is measured using a value of the flowing current. Note that a distance L34 between the edge of the third electrode 133 and the edge of the fourth electrode 134 is specified when the coordinate detecting device of the present embodiment is manufactured.

A distance L3 between the third electrode 133 and the second contact point 102 can be obtained based on the resistance R34, the distance L34 between the third electrode 133 and the fourth electrode 134, and the resistance R3. Also, a distance L4 between the fourth electrode 134 and the second contact point 102 can be obtained based on the resistance R34, the distance L34 between the third electrode 133 and the fourth electrode 134, and the resistance R4.

Specifically, as shown in FIG. 8, values for L3, L4 and L34 can be obtained according to L3=(L34/R34)×R3 and L4=(L34/R34)×R4. Subsequently, an angle $\alpha 2$ between L3 and L4 is obtained using the cosine law, whereby the coordinate position of the second contact point 102 is calculated.

By repeating the steps S102 through S120, two contact points can be continuously detected. Note that according to the present embodiment, not only when contact is made at two points but also when contact is made at a single point, the coordinate position of the contact point is detected by the same method. In this case, from among the first electrode 131, the second electrode 132, the third electrode 133 and the fourth electrode 134, two electrodes each having a higher current value, i.e. having a lower resistance value, are selected. Using a distance calculated using the two resistance values, an angle is obtained according to the cosine law. In this way, the coordinate position of the contact point can be calculated also when contact is made at a single point.

The reason for selecting electrodes having lower resistance is that such electrodes are located close to the contact point, and therefore contribute to high-precision point detection. In particular, an electrode having the lowest resistance is located closest to the contact point, and therefore contributes to even higher-precision point detection. In this case, an electrode to be subsequently selected after the electrode having the lowest resistance is either one of electrodes adjacent to the lowest-resistance electrode, and its resistance value is used for the above calculation. This is because, in general, it is often the case that a contact point is located off the center of the coordinate detecting device, and in the case where the contact point is located close to the lowest-resistance electrode, either one of the electrodes adjacent to the lowest-resistance electrode is also close to the contact point.

According to the present embodiment, it is possible to determine whether contact is made at a single point or two points. Specifically, after each resistance is calculated according to the above coordinate detecting method, the sum of the reciprocals of the resistance values is calculated. That is, a combined resistance is calculated based on an assumption that the resistances R1, R2, R3 and R4 are connected in parallel. In the case where contact is made at two points, the combined resistance is low compared to the case where contact is made at a single point, and falls below the combined resistance range for a single-point contact. Accordingly, whether contact is made at a single point or two points can be determined based on the combined resistance value.

Figure 9:
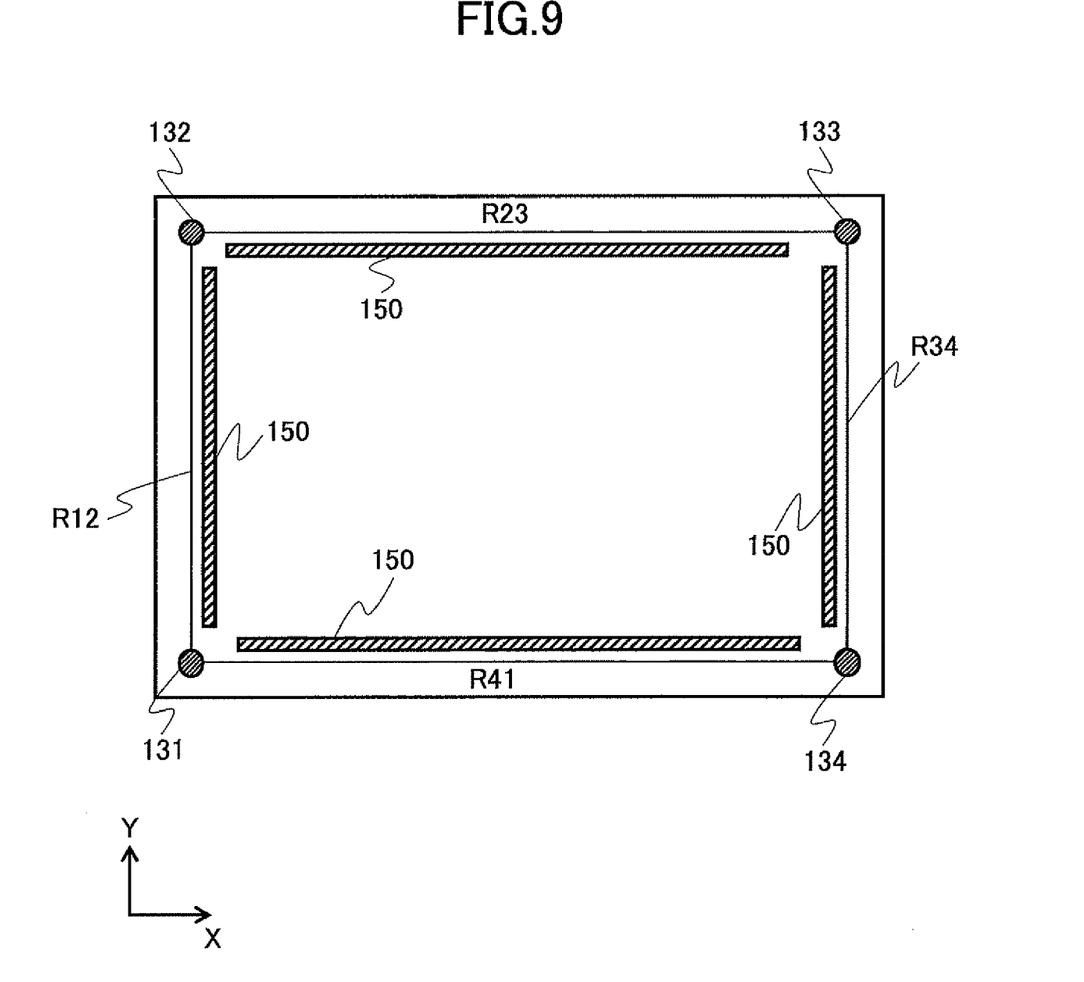
FIG. 9 is a front view illustrating a modification of the coordinate detecting device of the first embodiment.

Note that in the present embodiment, the transparent resistive film is made of ITO; however, a similar effect can be achieved using a material which is transparent in the visible range and includes indium oxide, tin oxide or zinc oxide. In addition, a resistive-film removed area 150 may be formed in a region shifted inward from a line between two adjacent electrodes, as illustrated in FIG. 9, in order to obtain more accurate values for the resistance R12 between the first electrode 131 and the second electrode 132, a resistance R23 between the second electrode 132 and the third electrode 133, the resistance R34 between the third electrode 133 and the fourth electrode 134 and a resistance 41 between the fourth electrode 134 and the first electrode 131. Accordingly, the current between two adjacent electrodes flows in a linear fashion, and an accurate resistance between the electrodes can be obtained.

(b) Second Embodiment

Next is described the second embodiment. The present embodiment relates to a coordinate detecting method for higher-precision point detection using the coordinate detecting device of the first embodiment. In general, when the coordinate detecting device is used as a touch panel, a point at which contact is made with a finger or the like is detected. In the case where contact is made with a finger or the like, there are very few cases that the contact is made at two points at the same time, and in many cases, the second contact is made a little behind the first contact.

Therefore, it is possible to detect the two points with higher precision by detecting the first contact point, and then detecting the second contact point based on information of the first contact point and subsequent measurement results.

Specifically, in the case where the first contact is made at the first contact point 101 and the second contact is made at the second contact point 102, the coordinate position of the first contact point 101 is detected by the coordinate detecting method (first measurement) according to the first embodiment. Subsequently, after the second contact is made at the second contact point 102, the coordinate position of the second contact point 102 is detected by the coordinate detecting method (second measurement) according to the first embodiment, and the resistances are then calculated.

In a general operation on a touch panel, it is often the case that the first contact is not largely shifted from the first contact point 101 at the time when the second contact is made at the second contact point 102. Even if the first contact is shifted, the precision can be maintained by carrying out the first measurement immediately before the second contact. Therefore, it is possible to detect the coordinate position of the second contact point 102 using the resistances used for calculating the coordinate position of the first contact point 101 (the resistances of the first measurement) and the resistances obtained by the second measurement.

These processes are explained with reference to FIGS. 10 and 11.

Figure 10:
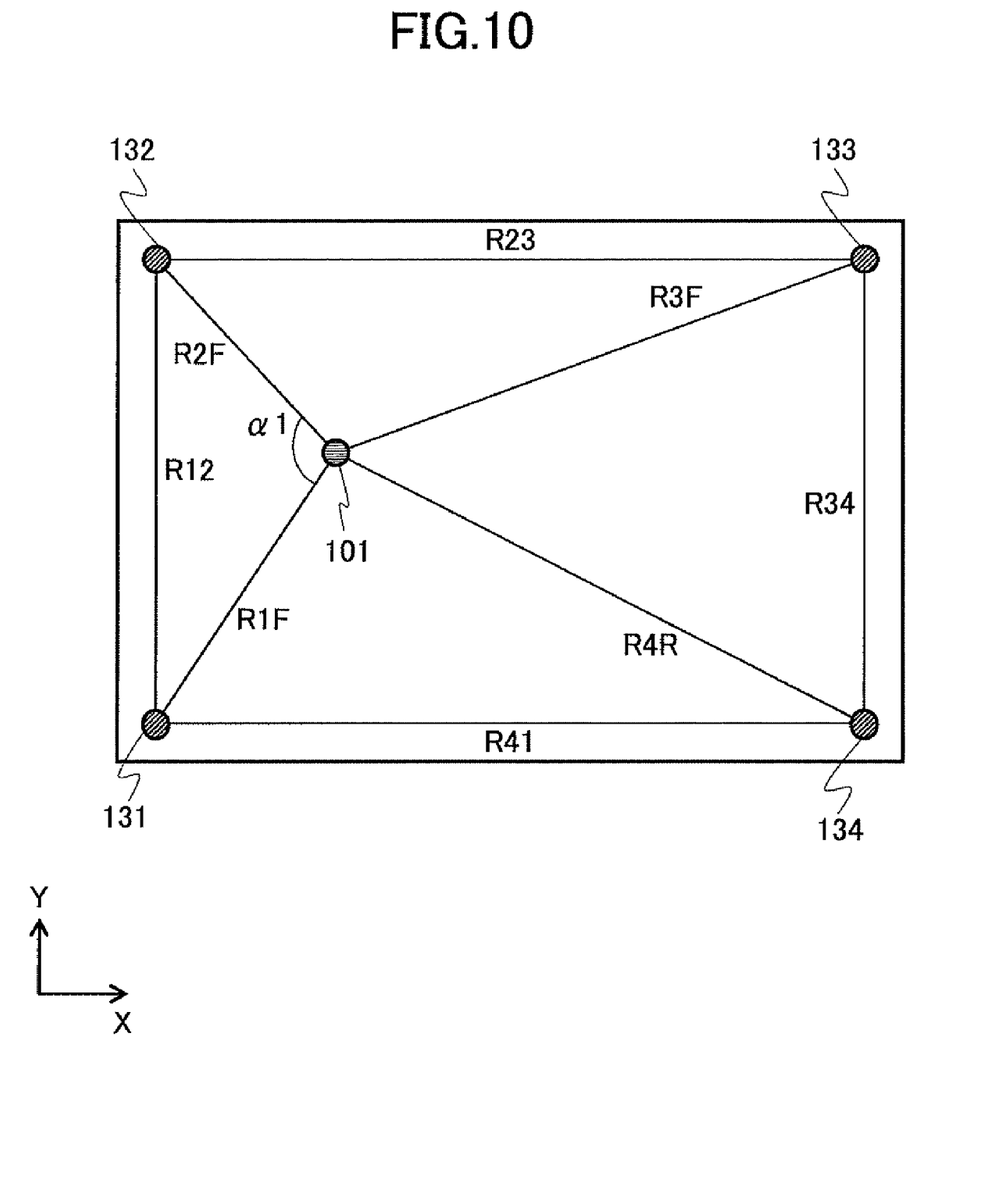
FIG. 10 is a schematic diagram (1) illustrating a detection process according to the coordinate detecting device of the second embodiment.

In the case where contact is first made only at the first contact point 101, as shown in FIG. 10, the following resistances are obtained according to the above-mentioned first measurement: a resistance R1F of the transparent resistive film 121 from the first electrode 131 to the first contact point 101; a resistance R2F of the transparent resistive film 121 from the second electrode 132 to the first contact point 101; a resistance R3F of the transparent resistive film 121 from the third electrode 133 to the first contact point 101; and a resistance R4F of the transparent resistive film 121 from the fourth electrode 134 to the first contact point 101. As described above in the first embodiment, from among these resistances, two lowest resistances are selected, and the angle $\alpha 1$ is obtained based on the selected resistances. Accordingly, the coordinate position of the first contact point 101 is detected.

Figure 11:
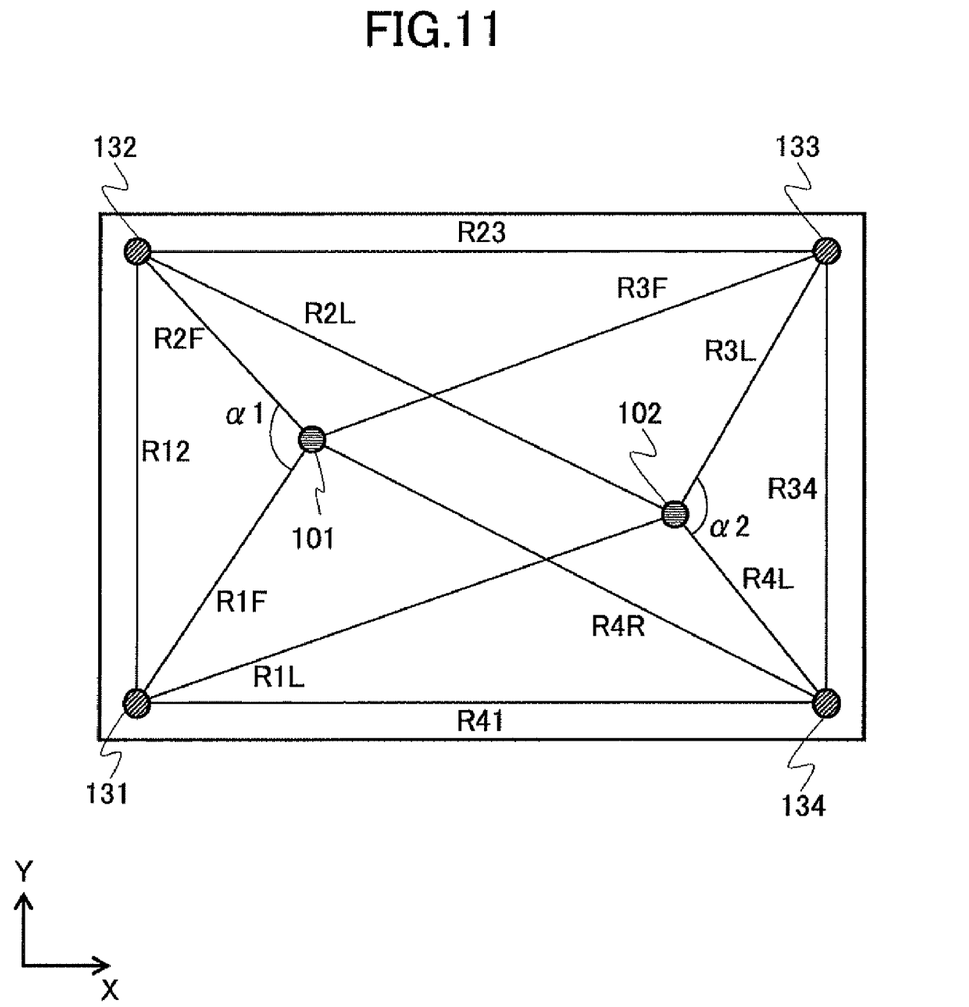
FIG. 11 is a schematic diagram (2) illustrating a detection process according to the coordinate detecting device of the second embodiment.

Assume that contact is then made at the second contact point 102, as shown in FIG. 11. That is to say, contact is made at two points, the first contact point 101 and the second contact point 102. At this point, the second measurement is carried out to obtain a combined resistance R1G of the transparent resistive film 121, which is the sum of the resistance from the first electrode 131 to the first contact point 101 and the resistance from the first electrode 131 to the second contact point 102; a combined resistance R2G of the transparent resistive film 121, which is the sum of the resistance from the second electrode 132 to the first contact point 101 and the resistance from the second electrode 132 to the second contact point 102; a combined resistance R3G of the transparent resistive film 121, which is the sum of the resistance from the third electrode 133 to the first contact point 101 and the resistance from the third electrode 133 to the second contact point 102; and a combined resistance R4G of the transparent resistive film 121, which is the sum of the resistance from the fourth electrode 134 to the first contact point 101 and the resistance from the fourth electrode 134 to the second contact point 102.

Here, the resistance of the transparent resistive film 121 from the first electrode 131 to the second contact point 102 is denoted as R1L; the resistance of the transparent resistive film 121 from the second electrode 132 to the second contact point 102 is denoted as R2L; the resistance of the transparent resistive film 121 from the third electrode 133 to the second contact point 102 is denoted as R3L; and the resistance of the transparent resistive film 121 from the fourth electrode 134 to the second contact point 102 is denoted as R4L. The above combined resistances can be assumed to be connected in parallel, and the resistances R4L through R4L are obtained by the following equations:

$$R1L=(R1 \times R1F)/(R1F-R1);$$

$$R2L=(R2 \times R2F)/(R2F-R2);$$

$$R3L=(R3 \times R3F)/(R3F-R3); \text{ and}$$

$$R4L=(R4 \times R4F)/(R4F-R4).$$

Based on the obtained resistances R1L through R4L, the angle $\alpha 2$ is obtained by the same procedure as Step S120 of the first embodiment, and the coordinate position of the second contact point 102 is calculated. In this way, the coordinate positions of the two points 101 and 102 are detected.

Note that, in the present embodiment, the voltage application cycles for the first electrode 131, the second electrode 132, the third electrode 133 and the fourth electrode 134 need to be determined in view of the time taken until contact is made at the second contact point 102 after the first contact point 101.

In summary, according to one aspect of the present invention, it is possible to detect a coordinate position of each contact point even when contact is made at two points.

While the embodiments of the present invention have been described above, it should be apparent that each embodiment is merely an example and the invention is not intended to be unduly limited by the illustrative embodiments.

This patent application is based on Japanese Priority Patent Application No. 2008-131940 filed on May 20, 2008, the entire contents of which are hereby incorporated herein by reference.

What is claimed is:

1. A coordinate detecting device comprising:
a resistive film disposed on a quadrangular substrate made of an insulating material;
a power source configured to apply a voltage to the resistive film;
four electrodes, each of which is connected to the power source and individually disposed in one of four corners of the resistive film;
four switches, each of which is individually disposed between the power source and one of the electrodes;
four ammeters, each of which is configured to measure a current flowing through a corresponding one of the electrodes; and
a grounded conductive film configured to detect coordinates of a contact point on the resistive film when the conductive film is brought in contact with the resistive film;
wherein the voltage is applied sequentially to the electrodes by opening and closing the switches,
when the conductive film is brought in contact with the resistive film, each of the ammeters sequentially measures the current flowing through the corresponding one of the electrodes, and
the coordinates of the contact point are detected based on positions of the electrodes and resistances obtained using currents measured by the ammeters.

2. The coordinate detecting device as claimed in claim 1, wherein the contact between the conductive film and the resistive film is made at a single point or two points on the resistive film.

3. The coordinate detecting device as claimed in claim 1, wherein the conductive film is made of a material transparent in a visible range and has a low sheet resistance compared to a sheet resistance of the resistive film.

4. The coordinate detecting device as claimed in claim 1, wherein a resistive film removed region, in which the resistive film is removed from the substrate, is disposed along four sides of the resistive film.

5. The coordinate detecting device as claimed in claim 1, wherein the conductive film is made of a material including one of indium tin oxide (ITO), a conductive polymer, $SnO_2$, $In_2O_3$ and ZnO.

6. The coordinate detecting device as claimed in claim 1, wherein the conductive film is disposed on a substrate made of one of polycarbonate, polyethylene terephthalate, glass, polyolefin and a micro olefin polymer.

7. A coordinate detecting method applied to a coordinate detecting device including:
a resistive film disposed on a quadrangular substrate made of an insulating material;
a power source configured to apply a voltage to the resistive film;
four electrodes including a first electrode, a second electrode, a third electrode and a fourth electrode, each of which is connected to the power source and individually disposed in one of four corners of the resistive film;
four switches including a first switch which is disposed between the power source and the first electrode, a second switch which is disposed between the power source and the second electrode, a third switch which is disposed between the power source and the third electrode, and a fourth switch which is disposed between the power source and the fourth electrode;
four ammeters including a first ammeter which is connected in series to the first switch and configured to measure a first current flowing through the first electrode, a second ammeter which is connected in series to the second switch and configured to measure a second current flowing through the second electrode, a third ammeter which is connected in series to the third switch and configured to measure a third current flowing through the third electrode, and a fourth ammeter which is connected in series to the fourth switch and configured to measure a fourth current flowing through the fourth electrode; and
a grounded conductive film configured to detect coordinates of a contact point on the resistive film when the conductive film is brought in contact with the resistive film;
the coordinate detecting method comprising:
a first measurement step of closing only the first switch, applying the voltage to the resistive film, and causing the first ammeter to measure the first current;
a second measurement step of opening the first switch, then closing only the second switch, applying the voltage to the resistive film, and causing the second ammeter to measure the second current;
a third measurement step of opening the second switch, then closing only the third switch, applying the voltage to the resistive film, and causing the third ammeter to measure the third current;
a fourth measurement step of opening the third switch, then closing only the fourth switch, applying the voltage to the resistive film, and causing the fourth ammeter to measure the fourth current;
a first calculation step of calculating resistances, each of which is individually obtained based on one of the first current, the second current, the third current and the fourth current; and
a second calculation step of calculating, based on the calculated resistances, the coordinates of a single contact point or two contact points on the resistive film.

8. The coordinate detecting method as claimed in claim 7, wherein in the second calculation step, the coordinates of the single contact point are calculated based on two resistances out of the calculated resistances, the two resistances including a lowest resistance and a resistance corresponding to one of electrodes adjacent to an electrode corresponding to the lowest resistance.

9. The coordinate detecting method as claimed in claim 7, wherein a combined resistance of the calculated resistances connected in parallel is calculated, and whether the contact between the conductive film and the resistive film is made at a single point or two points on the resistive film is determined based on the combined resistance.

* * * * *